United States Patent [19]

Doetsch

[11] Patent Number: 5,244,644

[45] Date of Patent: Sep. 14, 1993

[54] PROCESS FOR IMPROVING THE STORAGE STABILITY OF PERCARBONATE AND PERCARBONATE COMPOSITION PRODUCED THEREBY

[75] Inventor: Werner Doetsch, Bad Hoenningen, Fed. Rep. of Germany

[73] Assignee: Peroxid-Chemie GmbH, Hoellriegelskreuth, Fed. Rep. of Germany

[21] Appl. No.: 846,664

[22] Filed: Mar. 5, 1992

[30] Foreign Application Priority Data

Mar. 13, 1991 [DE] Fed. Rep. of Germany ....... 4108043

[51] Int. Cl.⁵ ............................................. C01B 15/10
[52] U.S. Cl. .............................. 423/275; 252/186.43; 423/415.2
[58] Field of Search ..................... 423/272, 415 P, 274, 423/275; 252/186.43

[56] References Cited

U.S. PATENT DOCUMENTS

| | | | |
|---|---|---|---|
| 1,225,872 | 5/1917 | Schaidhauf | 423/415 P |
| 3,677,697 | 7/1972 | Yanush | 423/415 P |
| 4,025,609 | 5/1977 | Matsunaga | 423/415 P |
| 4,071,462 | 1/1978 | Matsunaga et al. | 423/415 P |
| 4,325,933 | 4/1982 | Matsumoto et al. | 423/272 |
| 4,970,058 | 11/1990 | Hills et al. | 423/272 |

FOREIGN PATENT DOCUMENTS

| | | | |
|---|---|---|---|
| 0030759 | 6/1981 | European Pat. Off. | 423/415 P |
| 0138191 | 10/1979 | Fed. Rep. of Germany | 423/415 P |
| 92896 | 7/1975 | Japan | 423/415 P |
| 1191571 | 5/1970 | United Kingdom | 423/415 P |

OTHER PUBLICATIONS

Derwent Abstract No. 79-28,324 of JP 54-008197 (Jan. 22, 1979).
Derwent Abstract No. 80-29,875 of JP 55-034217 (Mar. 11, 1980).
Derwent Abstract No. 84-065155 of JP 59-020397 (Feb. 2, 1984).

*Primary Examiner*—Wayne Langel
*Attorney, Agent, or Firm*—Evenson, McKeown, Edwards & Lenahan

[57] ABSTRACT

A process for producing an alkali metal carbonate peroxyhydrate having improved storage stability by mixing particles of an alkali metal carbonate peroxyhydrate with an effective storage stability improving amount of a powdered fatty acid metal salt.

13 Claims, No Drawings

PROCESS FOR IMPROVING THE STORAGE STABILITY OF PERCARBONATE AND PERCARBONATE COMPOSITION PRODUCED THEREBY

BACKGROUND OF THE INVENTION

This invention relates to a process for improving the storage stability of alkali metal carbonate peroxyhydrates, hereinafter referred to as percarbonates, particularly sodium percarbonate, produced by known prior art processes.

Sodium percarbonate is used as a bleaching agent for detergent and cleaning agent compositions and as a sterilizing agent. Sodium percarbonate has advantageous dissolution properties and a high bleaching effect when used as a bleaching agent at low temperatures. Although sodium percarbonate is a compound which is chemically stable as such under standard conditions, it tends to recrystallize during prolonged storage, particularly under the influence of atmospheric humidity, and to form small needle-type crystallites which easily fuse with each other. This recrystallization during storage causes caking which increases if the stored sodium percarbonate is additionally subjected to pressure during storage. Caking can increase to such an extent during this process that an originally free-flowing sodium percarbonate produced by a known prior art process solidifies to form a block. Consequently, sodium percarbonate is not suitable for storage in silos, since recrystallization and caking occur particularly easily under the conditions necessary for silo storage (exchange of air, pressure exerted by the upper layers of product onto the lower layers of product) and the entire silo becomes blocked. In practice, sodium percarbonate is therefore collected after manufacture in large sacks with a capacity of approximately 1,000 kg and stored by the manufacturer in these until delivery. It is necessary to stack these large sacks in not more than two layers in order to prevent the sodium percarbonate from being subjected to excessive pressure. However, even with this type of intermediate storage, it is not possible to prevent sodium percarbonate from recrystallizing and caking. In order to assure a free-flowing product, it is thus necessary to empty the large sacks before delivery to the purchaser, to comminute the caked agglomerate of sodium percarbonate, and to repackage the comminuted product. It goes without saying that such a procedure comprising comminution and repacking of the sodium percarbonate crystals is extremely time-consuming and costly.

Prior art processes for chemically stabilizing sodium percarbonate, e.g. by introducing suitable stabilizers during the manufacture of the percarbonate from soda and hydrogen peroxide, or by subsequently coating the percarbonate with a suitable coating material such as boric acid, borates, magnesium silicates, etc., do not produce any significant improvement in this recrystallization and caking problem. Although the conventional stabilizers added during the production process and incorporated into the sodium percarbonate substantially stabilize the sodium percarbonate from the chemical point of view, they do not prevent recrystallization.

In addition, the rearrangement of water of crystallization associated with the recrystallization process also leads to the partial dissolution of the sodium percarbonate, making it possible for higher pH values to arise which causes additional decomposition of the sodium percarbonate. The conventional coating processes of the prior art also are incapable of suppressing recrystallization and caking. Moreover, it is difficult to coat percarbonate particles, since it is necessary to have a sufficiently smooth and homogeneous surface as free as possible from points and needle-shaped irregularities in order to successfully coat such particles.

SUMMARY OF THE INVENTION

It is therefore the object of the invention to provide a process for improving the storage stability of alkali metal carbonate peroxyhydrates.

It is also the object of the invention to provide an alkali metal carbonate peroxyhydrate composition having improved storage stability compared to the materials of the prior art.

Another object of the invention is to provide an alkali metal carbonate peroxyhydrate composition which overcomes the disadvantages of the prior art and exhibits improved resistance to recrystallization and caking.

These and other objects of the invention are achieved in accordance with the present invention by providing a process for inhibiting caking of an alkali metal carbonate peroxyhydrate during storage thereof comprising admixing the alkali metal carbonate peroxyhydrate in particle form with an effective anti-caking amount of a fatty acid metal salt in powder form.

In accordance with a further aspect of the invention, the objects are achieved by providing a composition of matter consisting essentially of an admixture of particulate alkali metal carbonate peroxyhydrate and an effective anti-caking amount of powdered fatty acid metal salt.

DETAILED DESCRIPTION OF PREFERRED EMBODIMENTS

The invention relates in the first instance to a process for producing a percarbonate product (i.e. alkali metal carbonate peroxyhydrate product) with improved storage stability which is characterized in that percarbonate particles (i.e. alkali metal carbonate peroxyhydrate particles) are mixed with a quantity of a fatty acid metal salt in powder form, the quantity being effective for improving the storage stability. Preferably, the percarbonate particles are mixed with a quantity, based on the percarbonate product, of 0.05 to 3% by weight, most preferably from 0.1 to 1.5% by weight of fatty acid metal salt, based on the weight of the product mixture.

In accordance with an advantageous embodiment of the process of the invention, alkali and/or alkaline earth metal salts of relatively long-chain saturated fatty acids (i.e. saturated aliphatic monocarboxylic acids containing more than 12 carbon atoms), which are preferably unbranched and contain up to 18 carbon atoms, particularly preferably 16 to 18 carbon atoms, are used as fatty acid metal salts. The salts of stearic acid have proved to be particularly advantageous. Preferably, the above-mentioned fatty acid metal salts are salts of the alkali and/or alkaline earth metals of the second and third periods of the periodic system of elements, in particular those of sodium, potassium, magnesium, or calcium. The use of magnesium stearate as a fatty acid metal salt in the process according to the invention is particularly preferred.

The present invention provides an effective, i.e. a simple, practical, economic and efficient, process for improving the storage stability of percarbonates, particularly that of sodium percarbonate. Recrystallization and/or caking of percarbonate is suppressed very effectively by the process according to the invention, not only over the short periods of intermediate storage, but also over long periods ranging from months to more than one year.

Percarbonate products stabilized according to the invention are almost free from caking even after long storage periods and can be conveyed to further uses without any problems of lump formation or caking.

The process of the invention makes available new, highly advantageous stabilized percarbonate products.

Consequently, the invention also relates to these percarbonate products which are characterized in that they consist essentially of a mixture of sodium percarbonate particles and of a fatty acid metal salt in powder form in a quantity effective for improving the storage stability. If desired, the percarbonate particles may optionally contain active oxygen stabilizers and/or may optionally be coated. Appropriate percarbonate products according to the invention consist essentially of 99.95 to 97.0% by weight, preferably 99.9 to 98.5% by weight, of sodium percarbonate particles and of 0.05 to 3.0% by weight, preferably 0.1 to 1.5% by weight of the fatty acid metal salt in powder form. The same alkali and/or alkaline earth metal salts of fatty acids described above in connection with the process according to the invention may serve as the fatty acid metal salts in the percarbonate products according to the invention, magnesium stearate being particularly preferred.

The following examples are intended to further illustrate the invention without limiting its scope.

EXAMPLE 1

The storage stability of sodium percarbonate (PCS) samples to which varying quantities of magnesium stearate and/or sodium stearate in powder form had been added, was evaluated by pressure storage tests using the standard test described below. For comparison, a PCS sample which was not stabilized according to the invention wa tested in the same manner.

Protocol

The storage stability of PCS was tested at a given pressure, elevated temperature, and an adjusted relative atmospheric humidity level.

Equipment

A climatic chamber capable of adjusting the temperature to 310° K. and the relative atmospheric humidity to 60 to 70% was used.

A compression mold was used to simulate a silo. The compression mold consisted of two demountable aluminium half dishes arranged vertically on the base of the compression mold. During the test, the half dishes were connected to each other by means of two rings. The tubular body of the compression mold formed by the two half dishes had an inner diameter of 40 mm and a height available for filling of 60 mm. Twenty small holes having a diameter of 2 mm were drilled at a height of approximately 28 mm. The compression mold was closed at the top by a compression mold cover in the form of a die to allow pressure to be applied. This compression mold cover consisted of a cylinder having a diameter of 39 mm and a height of 35 mm, at the top of which a circular pressure-application surface was arranged which had a diameter of 100 mm and was suitable for applying weights.

A pressure measuring device was also used to measure the applied pressure required to disintegrate a compacted sample of sodium percarbonate produced in the compression mold described above.

Procedure

The inner wall of the compression mold was lined with water vapor-permeable paper up to the level of the small holes. The compression mold was then filled two-thirds full with the sodium percarbonate sample to be tested. The compression mold cover was placed on top, and the sample was compressed at the preselected temperature (310° K.), a relative atmospheric humidity of 60 to 70%, and a preselected pressure (25 kg weight applied) applied for a period of 16 days. The compression mold was then opened, and the compacted sodium percarbonate sample was cut into a cube whose edges were 2×3 cm long. The pressure required to cause this cube to disintegrate under pressure was then determined using the pressure measuring device. The applied pressure, in $kg/cm^2$, required to cause the cube to disintegrate is a direct measure of the caking of the sodium percarbonate sample.

Following the foregoing pressure storage test, a pressure of 250 $g/cm^2$ had to be applied to a sodium percarbonate sample not stabilized according to the invention in order to cause the cube of compacted sodium percarbonate to disintegrate.

In comparison, samples of sodium percarbonate to which 0.125% by weight, 0.25% by weight, 0.5% by weight or 1% by weight magnesium stearate, or 0.25% by weight or 0.5% by weight sodium stearate had been added according to the invention were stabilized against recrystallization and caking to such an extent that the caking tendency of these PCS samples stabilized according to the invention could not be measured using the pressure measuring device because after the application of pressure to the PCS samples stabilized according to the invention was completed in the compression mold as described above, the sodium percarbonate product which was obtained was still free-flowing. Practically no compaction took place in the PCS samples stabilized according to the invention during the application of pressure in the compression mold, and when the application of pressure was completed, only slight lumping was detectable in the samples stabilized according to the invention.

EXAMPLE 2

In a plant test, sodium percarbonate from current production was mixed during packaging into large sacks (sacks with a capacity of 1000 kg) with 0.5% by weight magnesium stearate, and the filled sacks were stored stacked in two layers. After a storage period of 6 months, a first portion of the large sacks was discharged from storage, and after 18 months, a second portion of the large sacks was discharged. It was found that the sodium percarbonate stabilized according to the invention both from the large sacks in the upper layer and from those in the lower layer did not exhibit any undesirable caking, and that the sacks could all be emptied without any problems of lump formation.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for improving the caking resistance of an alkali metal carbonate peroxyhydrate during storage comprising admixing said alkali metal carbonate peroxyhydrate in particle form with an effective anti-caking amount of a fatty acid metal salt in powder form.

2. A process according to claim 1, wherein said fatty acid metal salt comprises from 0.05 to 3% by weight of the resulting product mixture.

3. A process according to claim 2, wherein said fatty acid metal salt comprises from 0.1 to 1.5% by weight of the resulting product mixture.

4. A process according to claim 1, wherein said fatty acid metal salt is an alkali metal or alkaline earth metal fatty acid salt.

5. A process according to claim 4, wherein said fatty acid metal salt is a salt of a fatty acid containing from 12 to 18 carbon atoms.

6. A process according to claim 5, wherein said fatty acid metal salt is a salt of a fatty acid containing from 16 to 18 carbon atoms.

7. A process according to claim 6, wherein said fatty acid metal salt is a salt of stearic acid.

8. A process according to claim 4, wherein said fatty acid metal salt is a salt of an alkali metal or alkaline earth metal of the second or third period of the periodic system of elements.

9. A process according to claim 4, wherein said fatty acid metal salt is a salt of a metal selected from the group consisting of sodium, potassium, magnesium and calcium.

10. A process according to claim 7, wherein said fatty acid metal salt is magnesium stearate.

11. A composition of matter consisting essentially of an admixture of particulate alkali metal carbonate peroxyhydrate and an effective anti-caking amount of powdered fatty acid metal salt.

12. A composition of matter according to claim 11, further including an effective active oxygen stabilizing amount of an active oxygen stabilizer.

13. A composition of matter according to claim 11, wherein said particulate alkali metal carbonate peroxyhydrate is coated.

* * * * *